United States Patent
Janarthanam et al.

(10) Patent No.: US 11,552,347 B2
(45) Date of Patent: Jan. 10, 2023

(54) BI-DIRECTIONAL SWITCHABLE COOLING FLOW FOR TRACTION BATTERY

(71) Applicant: Ford Global Technologies, LLC, Dearborn, MI (US)

(72) Inventors: Suriyaprakash Ayyangar Janarthanam, Canton, MI (US); Abdul Lateef, Canton, MI (US); John Sturza, Royal Oak, MI (US); Philip Michael Gonzales, Dearborn, MI (US); Chuck Honick, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 16/710,001

(22) Filed: Dec. 11, 2019

(65) Prior Publication Data

US 2021/0184288 A1  Jun. 17, 2021

(51) Int. Cl.
| | |
|---|---|
| *H01M 10/633* | (2014.01) |
| *H01M 10/613* | (2014.01) |
| *H01M 10/6568* | (2014.01) |
| *H01M 10/48* | (2006.01) |
| *H01M 10/625* | (2014.01) |

(Continued)

(52) U.S. Cl.
CPC .......... *H01M 10/633* (2015.04); *B60L 58/33* (2019.02); *H01M 10/486* (2013.01); *H01M 10/613* (2015.04); *H01M 10/625* (2015.04); *H01M 10/635* (2015.04); *H01M 10/6568* (2015.04); *B60L 2240/545* (2013.01); *H01M 2220/20* (2013.01)

(58) Field of Classification Search
CPC .... B60L 2240/545; B60L 50/64; B60L 58/26; B60L 58/33; H01M 10/486; H01M 10/613; H01M 10/617; H01M 10/625; H01M 10/633; H01M 10/635; H01M 10/6554; H01M 10/6556; H01M 10/6568; H01M 10/663; H01M 2220/20
See application file for complete search history.

(56) References Cited

U.S. PATENT DOCUMENTS

| | | |
|---|---|---|
| 8,852,782 B2 | 10/2014 | Lee et al. |
| 9,673,492 B2 | 6/2017 | Nemesh et al. |

(Continued)

FOREIGN PATENT DOCUMENTS

| | | |
|---|---|---|
| DE | 102007017172 A1 | 10/2008 |
| GB | 2539039 A | 12/2016 |

*Primary Examiner* — Adam A Arciero
(74) *Attorney, Agent, or Firm* — David B. Kelley; Carlson, Gaskey & Olds, P.C.

(57) ABSTRACT

An apparatus and method, according to an exemplary aspect of the present disclosure includes, among other things, a battery pack having a coolant inlet and a coolant outlet, a coolant source to cool the battery pack, and a proportional valve in communication with the coolant inlet and the coolant outlet, and in communication with the coolant source. A battery control module controls the proportional valve such that a direction of flow is switchable at the coolant inlet and the coolant outlet based on temperatures at the coolant inlet and the coolant outlet to provide bi-directional cooling flow through the battery pack. The battery control module directly connects the coolant outlet to the coolant inlet via the proportional valve to bypass the coolant source in response to a predetermined condition.

18 Claims, 4 Drawing Sheets

(51) Int. Cl.
*B60L 58/33* (2019.01)
*H01M 10/635* (2014.01)

(56) References Cited

U.S. PATENT DOCUMENTS

| | | |
|---|---|---|
| 9,698,437 B2 | 7/2017 | Blank et al. |
| 2012/0125022 A1* | 5/2012 | Maybury .............. F25B 25/005 62/113 |
| 2013/0130076 A1* | 5/2013 | Lee ..................... H01M 10/625 429/62 |
| 2013/0298583 A1* | 11/2013 | O'Donnell ............. B60H 1/323 62/115 |
| 2017/0214099 A1* | 7/2017 | Fleming ............ H01M 10/6568 |

* cited by examiner

BI-DIRECTIONAL SWITCHABLE COOLING FLOW FOR TRACTION BATTERY

TECHNICAL FIELD

This disclosure relates generally to a traction battery cooling system that includes a bi-directional switchable cooling flow.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), autonomous vehicles (AVs) fuel cell vehicles (FCVs), and battery electric vehicles (BEVs). The traction battery is a relatively high-voltage battery that selectively powers the electric machines and other electrical loads of the electrified vehicle. The traction battery can include battery arrays that each include a plurality of interconnected battery cells. A cooling system is used to control a temperature of the traction battery.

SUMMARY

An apparatus according to an exemplary aspect of the present disclosure includes, among other things, a battery pack having a coolant inlet and a coolant outlet, a coolant source to cool the battery pack, and a proportional valve in communication with the coolant inlet and the coolant outlet, and in communication with the coolant source. A battery control module controls the proportional valve such that a direction of flow is switchable at the coolant inlet and the coolant outlet based on temperatures at the coolant inlet and the coolant outlet to provide bi-directional cooling flow through the battery pack. The battery control module directly connects the coolant outlet to the coolant inlet via the proportional valve to bypass the coolant source in response to a predetermined condition.

In a further non-limiting embodiment of the foregoing apparatus, the predetermined condition comprises a cold start condition wherein the proportional valve directly connects the coolant outlet to the coolant inlet to raise a temperature of the battery pack to a desired temperature.

In a further non-limiting embodiment of any of the foregoing apparatus, the coolant source comprises a cooling loop connected to a radiator.

In a further non-limiting embodiment of any of the foregoing apparatus, a first temperature sensor measures a temperature at the coolant inlet and a second temperature sensor measures a temperature at the coolant outlet.

In a further non-limiting embodiment of any of the foregoing apparatus, a pump has a pump inlet fluidly connected to the coolant outlet via the proportional valve, and a pump outlet fluidly connected to the coolant inlet, and wherein the pump is activated during the predetermined condition.

In a further non-limiting embodiment of any of the foregoing apparatus, coolant flows in a first direction from the coolant inlet to the coolant outlet when the temperature at the coolant outlet is below a predetermined temperature, and wherein coolant flows in a second direction, opposite from the first direction, from the coolant outlet to the coolant inlet when the temperature at the coolant outlet is above the predetermined temperature.

In a further non-limiting embodiment of any of the foregoing apparatus, the proportional valve includes a plurality of ports including at least a first port that is in fluid communication with an outlet of the coolant source, a second port that is in fluid communication with the outlet of the coolant source, a third port that is in fluid communication with the coolant inlet, a fourth port that is in fluid communication with the coolant outlet, a fifth port that is in fluid communication with an inlet of the coolant source, and a sixth port that is in fluid communication with the coolant inlet, and wherein when coolant flows in the first direction, the proportional valve connects the first port to the sixth port to direct coolant from the coolant source into the coolant inlet, connects the fourth port to the fifth port to return the coolant from the coolant outlet to the inlet to the coolant source, and blocks the second port and the third port, and when coolant flows in the second direction, the proportional valve connects the second port to the fourth port to direct coolant from the coolant source into the coolant outlet, connects the third port to the fifth port to return the coolant from the coolant inlet to the inlet to the coolant source, and blocks the first port and the sixth port.

In a further non-limiting embodiment of any of the foregoing apparatus, the proportional valve connects the fourth port to the sixth port to direct coolant from the coolant outlet to the coolant inlet in response to the predetermined condition, and blocks the first port, second port, third port and fifth port.

An apparatus, according to yet another exemplary aspect of the present disclosure includes, among other things, a battery pack having a coolant inlet and a coolant outlet, a coolant source comprising a cooling loop that connects the battery pack to a radiator, and a proportional valve in communication with the coolant inlet and the coolant outlet, and in communication with the coolant source. A battery control module controls the proportional valve to switch between at least first, second, and third flow configurations. The first flow configuration comprises coolant flowing in a first direction from the coolant inlet to the coolant outlet when a temperature at the coolant outlet is below a predetermined temperature. The second flow configuration comprises coolant flowing in a second direction, opposite from the first direction, from the coolant outlet to the coolant inlet when the temperature at the coolant outlet is above the predetermined temperature. The third flow configuration comprises coolant flowing directly from the coolant outlet to the coolant inlet to bypass the coolant source in response to a predetermined condition.

In a further non-limiting embodiment of any of the foregoing apparatus, the predetermined condition comprises a cold start condition wherein the proportional valve directly connects the coolant outlet to the coolant inlet to raise a temperature of the battery pack to a desired temperature.

In a further non-limiting embodiment of any of the foregoing apparatus, a first temperature sensor measures a temperature at the coolant inlet and a second temperature sensor measures a temperature at the coolant outlet, and wherein the battery control module receives temperature data from the first and second temperature sensors.

In a further non-limiting embodiment of any of the foregoing apparatus, a pump has a pump inlet fluidly connected to the coolant outlet via the proportional valve, and a pump outlet fluidly connected to the coolant inlet, and wherein the pump is activated during the predetermined condition.

In a further non-limiting embodiment of any of the foregoing apparatus, the proportional valve includes a plurality of ports including at least a first port that is in fluid communication with an outlet of the coolant source, a second port that is in fluid communication with the outlet of the coolant source, a third port that is in fluid communication with the coolant inlet, a fourth port that is in fluid communication with the coolant outlet, a fifth port that is in fluid communication with an inlet of the coolant source, and a sixth port that is in fluid communication with the coolant inlet, and wherein when coolant flows in the first direction, the proportional valve connects the first port to the sixth port to direct coolant from the coolant source into the coolant inlet, connects the fourth port to the fifth port to return the coolant from the coolant outlet to the inlet to the coolant source, and blocks the second port and the third port, and when coolant flows in the second direction, the proportional valve connects the second port to the fourth port to direct coolant from the coolant source into the coolant outlet, connects the third port to the fifth port to return the coolant from the coolant inlet to the inlet to the coolant source, and blocks the first port and the sixth port.

In a further non-limiting embodiment of any of the foregoing apparatus, the proportional valve connects the fourth port to the sixth port to direct coolant from the coolant outlet to the coolant inlet in response to the predetermined condition, and blocks the first port, second port, third port and fifth port.

A method according to still another exemplary aspect of the present disclosure includes, among other things, providing a battery pack having a coolant inlet and a coolant outlet, a coolant source to cool the battery pack, and a proportional valve that is in communication with the coolant inlet and the coolant outlet, and that is in communication with the coolant source; switching a direction of flow at the coolant inlet and the coolant outlet based on temperatures at the coolant inlet and the coolant outlet to provide bi-directional cooling flow capability through the battery pack; and directly connecting the coolant outlet to the coolant inlet via the proportional valve to bypass the coolant source in response to a predetermined condition.

In a further non-limiting embodiment of the foregoing method, the method includes connecting a pump inlet from a pump to the coolant outlet via the proportional valve, connecting a pump outlet to the coolant inlet, and activating the pump during the predetermined condition.

In a further non-limiting embodiment of any of the foregoing methods, the method includes controlling the proportional valve such that coolant flows in a first direction from the coolant inlet to the coolant outlet when the temperature at the coolant outlet is below a predetermined temperature, and such that coolant flows in a second direction, opposite from the first direction, from the coolant outlet to the coolant inlet when the temperature at the coolant outlet is above the predetermined temperature.

In a further non-limiting embodiment of any of the foregoing methods, the method includes providing the proportional valve with a plurality of ports comprising at least a first port that is in fluid communication with an outlet of the coolant source, a second port that is in fluid communication with the outlet of the coolant source, a third port that is in fluid communication with the coolant inlet, a fourth port that is in fluid communication with the coolant outlet, a fifth port that is in fluid communication with an inlet of the coolant source, and a sixth port that is in fluid communication with the coolant inlet, and including, when coolant flows in the first direction, controlling the proportional valve to connect the first port to the sixth port to direct coolant from the coolant source into the coolant inlet, to connect the fourth port to the fifth port to return the coolant from the coolant outlet to the inlet to the coolant source, and to block the second port and the third port, and when coolant flows in the second direction, controlling the proportional valve to connect the second port to the fourth port to direct coolant from the coolant source into the coolant outlet, to connect the third port to the fifth port to return the coolant from the coolant inlet to the inlet to the coolant source, and to block the first port and the sixth port.

In a further non-limiting embodiment of any of the foregoing methods, the method includes controlling the proportional valve to connect the fourth port to the sixth port to direct coolant from the coolant outlet to the coolant inlet in response to the predetermined condition, and to block the first port, second port, third port and fifth port.

In a further non-limiting embodiment of any of the foregoing methods, the predetermined condition comprises a cold start condition wherein the proportional valve directly connects the coolant outlet to the coolant inlet to raise a temperature of the battery pack to a desired temperature.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details, among other things, an exemplary traction battery cooling system that includes a bi-directional switchable cooling flow. In one example, a battery control module controls a proportional valve such that a direction of flow is switchable at a pack coolant inlet and a pack coolant outlet based on temperatures at the coolant inlet and outlet to provide bi-directional cooling flow through the battery pack, and additionally, the battery control module directly connects the coolant outlet to the coolant inlet via the proportional valve to bypass a coolant source in response to a predetermined condition.

Figure 1:
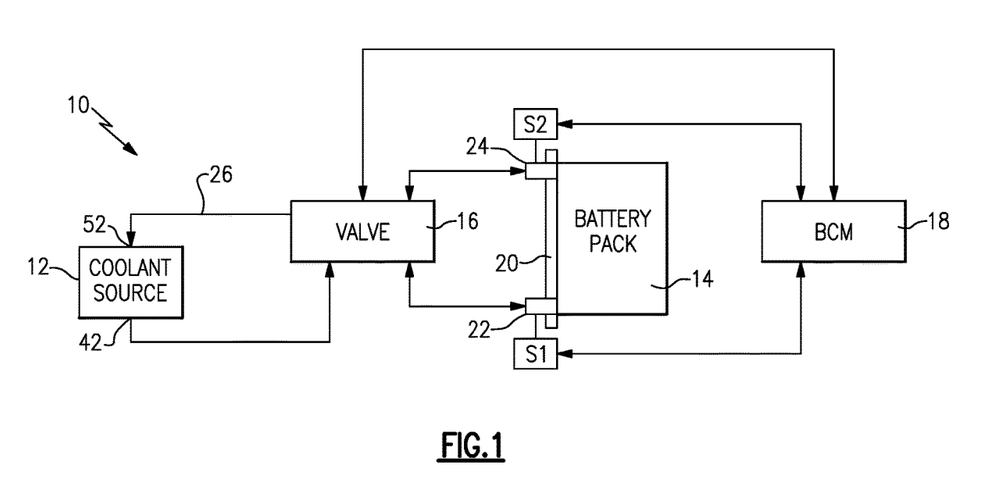
FIG. 1 illustrates a schematic view of a traction battery cooling system.

With reference to FIG. 1, a traction battery cooling system 10 includes a coolant source 12 that is in fluid communication with a battery pack 14 via one or more proportional valves 16. In one example, the battery pack 14 includes battery arrays that each include a plurality of interconnected battery cells as known. A battery control module (BCM) 18 controls the operation of the proportional valve 16 to control a temperature of the battery pack 14.

Figure 2:
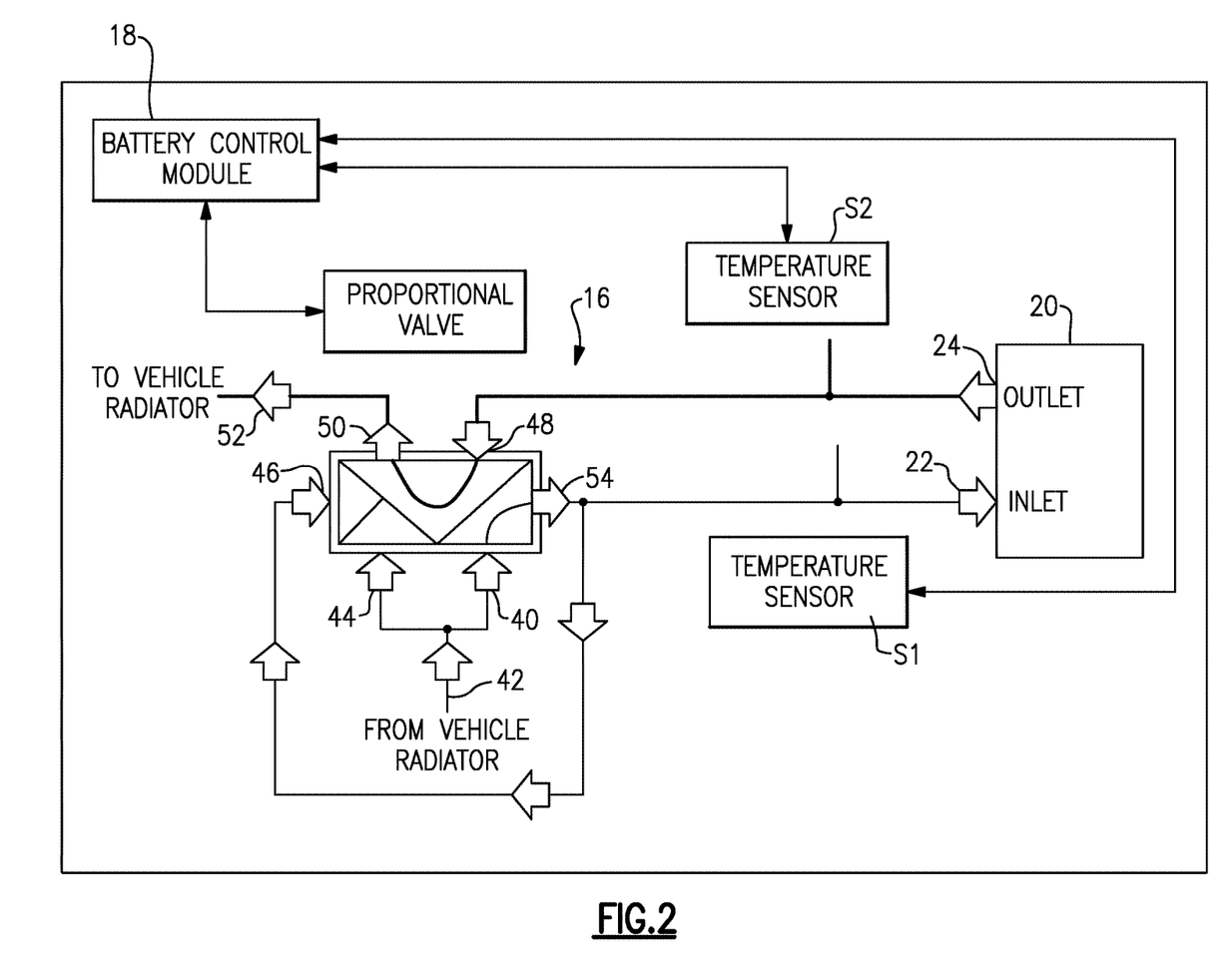
FIG. 2 illustrates a first flow configuration.
Figure 3:
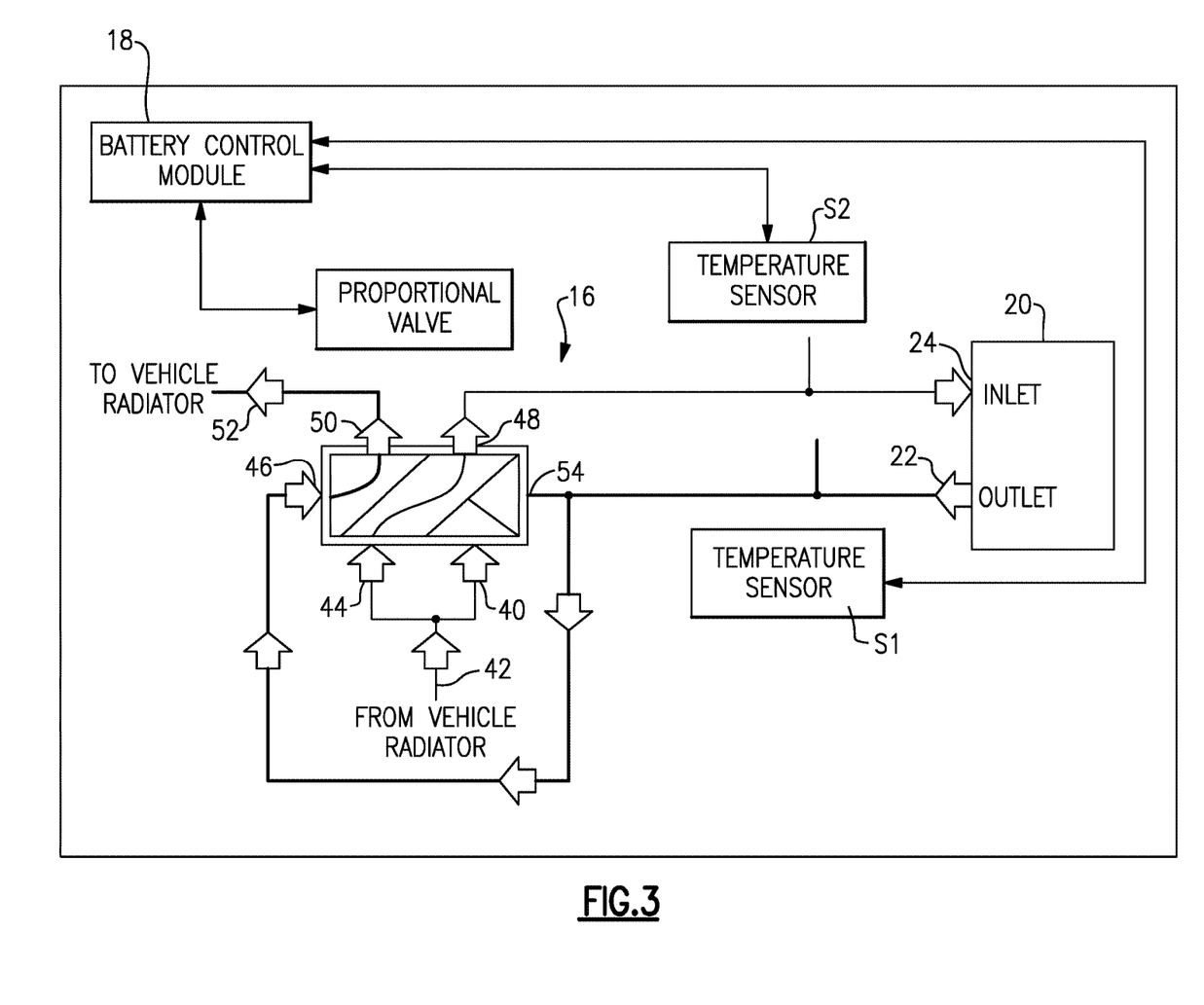
FIG. 3 illustrates a second flow configuration.
Figure 4:
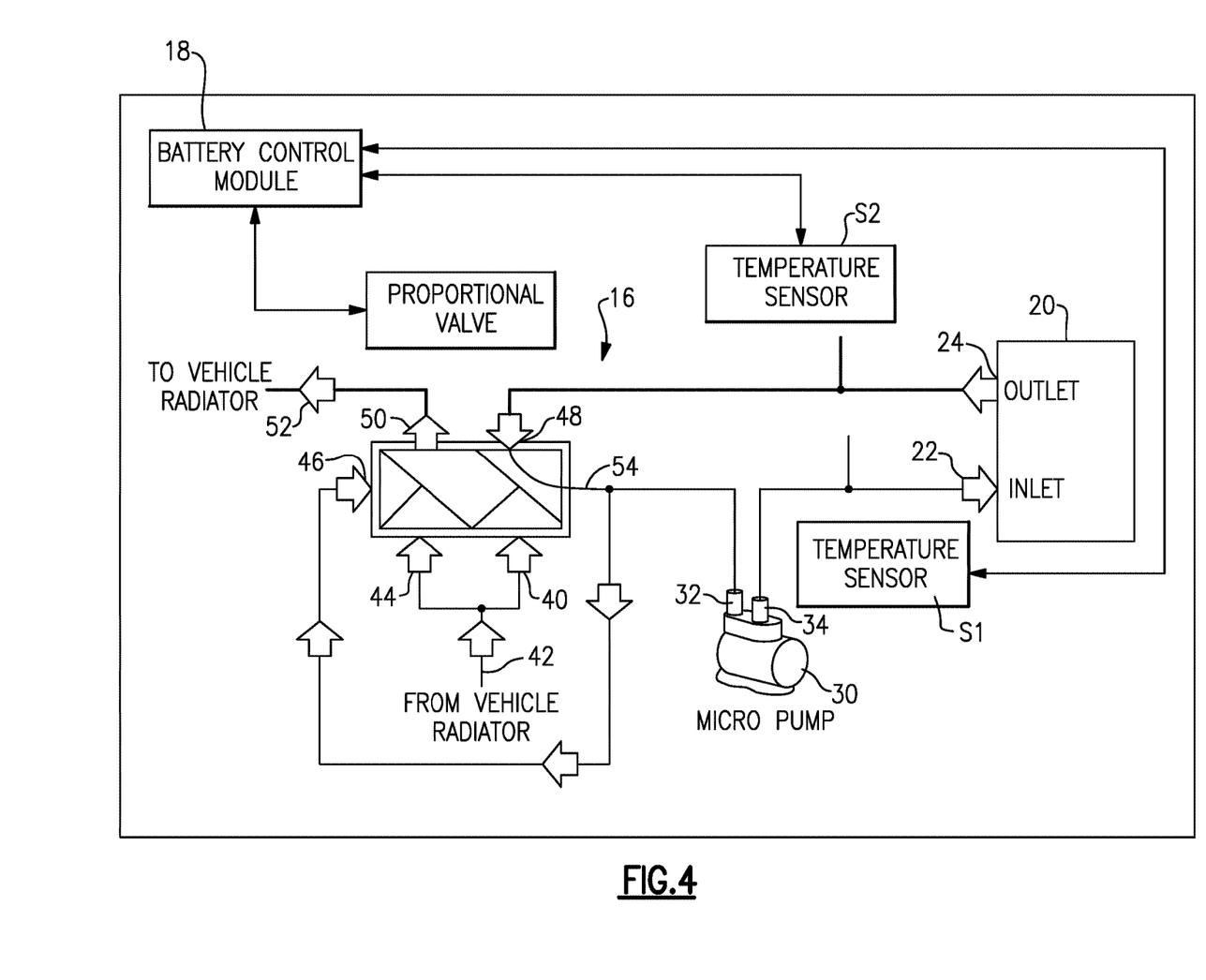
FIG. 4 illustrates a third flow configuration.

In one example, the battery pack 14 includes a battery thermal/cold plate 20 and a coolant inlet 22 and a coolant outlet 24. A first temperature sensor S1 measures a temperature at the coolant inlet 22 and a second temperature sensor S2 measures a temperature at the coolant outlet 24. The battery control module 18 receives temperature data from the first S1 and second S2 temperature sensors. In one example, the coolant source 12 comprises a radiator having a cooling loop 26 that connects the battery pack 14 to the coolant source 12. The proportional valve 16 is in fluid communication with the coolant inlet 22 and the coolant outlet 24, as well as being in fluid communication with the cooling loop 26 of the coolant source 12. The battery control module 18 is configured to control the proportional valve 16 to switch between at least first, second, and third flow configurations. In one example, the first flow configuration comprises coolant flowing in a first direction from the coolant inlet 22 to the coolant outlet 24 when a temperature at the coolant outlet 24 is below a predetermined temperature (FIG. 2). In one example, the second flow configuration comprises coolant flowing in a second direction, opposite from the first direction, from the coolant outlet 24 to the coolant inlet 22 when the temperature at the coolant outlet 24 is above the predetermined temperature (FIG. 3). In one example, the third flow configuration comprises coolant flowing directly from the coolant outlet 24 to the coolant inlet 22 to bypass the radiator 12 in response to a predetermined condition (FIG. 4).

In one example, the predetermined condition comprises a cold start condition where the proportional valve 16 directly connects the coolant outlet 24 to the coolant inlet 22 to raise a temperature of the battery pack 14 to a desired temperature. This direct connection allows for the battery pack 14 to be more quickly heated up to a more optimal temperature for efficiency purposes.

In one example, a pump 30 is provided to facilitate flow circulation. The pump 30 has a pump inlet 32 fluidly connected to the coolant outlet 24 via the proportional valve 16 and a pump outlet 34 fluidly connected to the coolant inlet 22. The BCM 18 moves the proportional valve 16 to the third flow configuration and activates the pump 30 once the predetermined condition is identified. In one example, the pump 30 comprises a micro pump.

In one example, the proportional valve 16 includes a plurality of ports including at least a first port 40 that is in fluid communication with an outlet 42 of the coolant source 12, a second port 44 that is in fluid communication with the outlet 42 of the coolant source 12, a third port 46 that is in fluid communication with the coolant inlet 22, a fourth port 48 that is in fluid communication with the coolant outlet 24, a fifth port 50 that is in fluid communication with an inlet 52 of the coolant source 12, and a sixth port 54 that is in fluid communication with the coolant inlet 22. FIGS. 2-4 show the closed and open states of the various ports for the first, second, and third flow configurations.

FIG. 2 shows the first flow configuration where coolant flows in a first direction from the coolant inlet 22 to the coolant outlet 24. In this configuration, the proportional valve 16 connects the first port 40 to the sixth port 54 to direct coolant from the coolant source 12 into the coolant inlet 22. The proportional valve 16 connects the fourth port 48 to the fifth port 50 to return the coolant exiting from the coolant outlet 24 to the inlet 52 of the coolant source 12. The proportional valve 16 blocks the second port 44 and the third port 46. The battery control module 18 monitors the temperature data of both the coolant inlet 22 and outlet 24 via the temperature sensors S1 and S2. As long as the temperature of the coolant outlet 24 remains below a predetermined threshold, the coolant flows through the battery pack 14 from the coolant inlet 22 to the outlet 24 as shown in FIG. 2.

When a threshold temperature is reached at the coolant outlet 24, the battery control module 18 switches the valve position such that the inlet becomes outlet and vice versa at the battery thermal/cold plate 20 as shown in FIG. 3. FIG. 3 shows the second flow configuration where coolant flows in a second direction from the coolant outlet 24 to the coolant inlet 22. In this configuration, the proportional valve 16 connects the second port 44 to the fourth port 48 to direct coolant from the coolant source 12 into the coolant outlet 24. The proportional valve 16 connects the third port 46 to the fifth port 50 to return the coolant exiting the coolant inlet 22 to the inlet 52 to the coolant source 12. The proportional valve 16 blocks the first port 40 and the sixth port 54. The battery control module 18 monitors and switches flow direction again when the temperature at the coolant inlet 22 goes above the threshold temperature. The battery control module 18 continues this cycling based on outlet temperature. This maintains the temperature across the battery pack 14 at a more uniform temperature throughout, and improves the battery pack utility.

FIG. 4 shows the third flow configuration where the proportional valve 16 is used to quickly heat up the battery pack 14 by directly connecting the coolant outlet 24 to the inlet 22 and bypassing the coolant source 12. This is, for example, initiated by the battery control module 18 during a vehicle start up condition to bring up the pack temperature to a more effective level and to increase efficiency of the cells. In this configuration, the proportional valve 16 connects the fourth port 48 to the sixth port 54 to direct coolant from the coolant outlet 24 to the coolant inlet 22. The proportional valve 16 blocks the first port 40, second port 44, third port 46 and fifth port 50. The battery control module 18 determines when to control the proportional valve 16 for this configuration based on data from the inlet and outlet temperature sensors S1 and S2.

Increasing power demand or current flow through a battery cell increases cell temperature in direct proportion. An efficient and effective cooling system 10 is provided for electric vehicles to keep the battery pack overall temperature under an optimum level. It has been found that differential temperatures between battery cells can peak quickly in a given cell array in high power demand situations. Cells that receive more cooling can maintain a lower temperature, whereas the temperature goes up quickly in some cells that do not have similar efficient cooling. These higher temperature cells dictate the battery pack overall temperature and bring up power limitation and utilization controls to the battery pack 14. The rise in cell temperature is directly proportional to the amount of heat that a battery cell can reject through the coolant. If the coolant temperature is low then the cell can dissipate more heat to the coolant. If the coolant temperature becomes higher than the cell can dissipate only limited heat to the coolant, which causes the cell temperature to increase quickly for a given current flow through the system.

The subject disclosure provides a traction battery cooling system 10 that can cycle and switch the coolant inlet and outlet based on coolant temperature input by one or more proportional valves, thus making coolant flow bi-directional when needed to maintain uniform temperature in all cells by providing a more effective coolant medium across the battery pack 14.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
   a battery pack having a coolant inlet and a coolant outlet;
   a coolant source to cool the battery pack;
   a proportional valve in communication with the coolant inlet and the coolant outlet, and in communication with the coolant source; and
   a battery control module that controls the proportional valve such that a direction of flow is switchable at the coolant inlet and the coolant outlet based on temperatures at the coolant inlet and the coolant outlet to provide bi-directional cooling flow through the battery pack, and wherein the battery control module directly connects the coolant outlet to the coolant inlet via the proportional valve to bypass the coolant source in response to a predetermined condition.

2. The apparatus according to claim 1, wherein the predetermined condition comprises a cold start condition wherein the proportional valve directly connects the coolant outlet to the coolant inlet to raise a temperature of the battery pack to a desired temperature.

3. The apparatus according to claim 1, wherein the coolant source comprises a cooling loop connected to a radiator.

4. The apparatus according to claim 1, including a first temperature sensor to measure a temperature at the coolant inlet and a second temperature sensor to measure a temperature at the coolant outlet.

5. The apparatus according to claim 1, including a pump having a pump inlet fluidly connected to the coolant outlet via the proportional valve, and a pump outlet fluidly connected to the coolant inlet, and wherein the pump is activated during the predetermined condition.

6. The apparatus according to claim 1, wherein coolant flows in a first direction from the coolant inlet to the coolant outlet when the temperature at the coolant outlet is below a predetermined temperature, and wherein coolant flows in a second direction, opposite from the first direction, from the coolant outlet to the coolant inlet when the temperature at the coolant outlet is above the predetermined temperature.

7. The apparatus according to claim 6, wherein the proportional valve includes a plurality of ports including at least a first port that is in fluid communication with an outlet of the coolant source, a second port that is in fluid communication with the outlet of the coolant source, a third port that is in fluid communication with the coolant inlet, a fourth port that is in fluid communication with the coolant outlet, a fifth port that is in fluid communication with an inlet of the coolant source, and a sixth port that is in fluid communication with the coolant inlet, and wherein
   when coolant flows in the first direction, the proportional valve connects the first port to the sixth port to direct coolant from the coolant source into the coolant inlet, connects the fourth port to the fifth port to return the coolant from the coolant outlet to the inlet to the coolant source, and blocks the second port and the third port, and
   when coolant flows in the second direction, the proportional valve connects the second port to the fourth port to direct coolant from the coolant source into the coolant outlet, connects the third port to the fifth port to return the coolant from the coolant inlet to the inlet to the coolant source, and blocks the first port and the sixth port.

8. The apparatus according to claim 7, wherein the proportional valve connects the fourth port to the sixth port to direct coolant from the coolant outlet to the coolant inlet in response to the predetermined condition, and blocks the first port, second port, third port and fifth port.

9. The apparatus according to claim 1, wherein the proportional valve includes at least a first port that is in fluid communication with the coolant outlet of the battery pack and a second port that is in fluid communication with the coolant inlet of the battery pack, and wherein the proportional valve connects the first port directly to the second port to direct coolant from the coolant outlet to the coolant inlet while bypassing the coolant source in response to the predetermined condition.

10. The apparatus according to claim 1, wherein switching the direction of flow through the battery pack, and a direct connection of the coolant outlet to the coolant inlet to bypass the coolant source is all via the proportional valve.

11. An apparatus, comprising:
    a battery pack having a coolant inlet and a coolant outlet;
    a coolant source comprising a cooling loop that connects the battery pack to a radiator;
    a proportional valve in communication with the coolant inlet and the coolant outlet, and in communication with the coolant source; and
    a battery control module that controls the proportional valve to switch between at least first, second, and third flow configurations, and wherein the first flow configuration comprises coolant flowing in a first direction from the coolant inlet to the coolant outlet when a temperature at the coolant outlet is below a predetermined temperature, and wherein the second flow configuration comprises coolant flowing in a second direction, opposite from the first direction, from the coolant outlet to the coolant inlet when the temperature at the coolant outlet is above the predetermined temperature, and wherein the third flow configuration comprises coolant flowing directly from the coolant outlet to the coolant inlet to bypass the coolant source in response to a predetermined condition.

12. The apparatus according to claim 11, wherein the predetermined condition comprises a cold start condition wherein the proportional valve directly connects the coolant outlet to the coolant inlet to raise a temperature of the battery pack to a desired temperature.

13. The apparatus according to claim 11, including a first temperature sensor to measure a temperature at the coolant inlet and a second temperature sensor to measure a temperature at the coolant outlet, and wherein the battery control module receives temperature data from the first and second temperature sensors.

14. The apparatus according to claim 11, including a pump having a pump inlet fluidly connected to the coolant outlet via the proportional valve, and a pump outlet fluidly connected to the coolant inlet and wherein the pump is activated during the predetermined condition.

15. The apparatus according to claim 11, wherein the proportional valve includes a plurality of ports including at least a first port that is in fluid communication with an outlet of the coolant source, a second port that is in fluid communication with the outlet of the coolant source, a third port that is in fluid communication with the coolant inlet, a fourth port that is in fluid communication with the coolant outlet, a fifth port that is in fluid communication with an inlet of the coolant source, and a sixth port that is in fluid communication with the coolant inlet, and wherein when coolant flows in the first direction, the proportional valve connects the first port to the sixth port to direct coolant from the coolant source into the coolant inlet, connects the fourth port to the fifth port to return the coolant from the coolant outlet to the inlet to the coolant source, and blocks the second port and the third port, and when coolant flows in the second direction, the proportional valve connects the second port to the fourth port to direct coolant from the coolant source into the coolant outlet, connects the third port to the fifth port to return the coolant from the coolant inlet to the inlet to the coolant source, and blocks the first port and the sixth port.

16. The apparatus according to claim 15, wherein the proportional valve connects the fourth port to the sixth port to direct coolant from the coolant outlet to the coolant inlet in response to the predetermined condition, and blocks the first port, second port, third port and fifth port.

17. The apparatus according to claim 11, wherein the proportional valve includes at least a first port that is in fluid communication with the coolant outlet of the battery pack and a second port that is in fluid communication with the coolant inlet of the battery pack, and wherein the proportional valve connects the first port directly to the second port to direct coolant from the coolant outlet to the coolant inlet while bypassing the coolant source in response to the predetermined condition.

18. The apparatus according to claim 11, wherein switching the direction of flow through the battery pack, and a direct connection of the coolant outlet to the coolant inlet to bypass the coolant source is all via the proportional valve.

\* \* \* \* \*